US010399384B2

(12) United States Patent
Iwamura et al.

(10) Patent No.: US 10,399,384 B2
(45) Date of Patent: Sep. 3, 2019

(54) AIRLESS TIRE

(71) Applicant: SUMITOMO RUBBER INDUSTRIES, LTD., Kobe-shi (JP)

(72) Inventors: Wako Iwamura, Kobe (JP); Makoto Sugiya, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 331 days.

(21) Appl. No.: 15/103,225

(22) PCT Filed: Dec. 17, 2014

(86) PCT No.: PCT/JP2014/083428
§ 371 (c)(1),
(2) Date: Jun. 9, 2016

(87) PCT Pub. No.: WO2015/098656
PCT Pub. Date: Jul. 2, 2015

(65) Prior Publication Data
US 2018/0093527 A1   Apr. 5, 2018

(30) Foreign Application Priority Data
Dec. 24, 2013 (JP) ................. 2013-265792

(51) Int. Cl.
*B60C 7/14*   (2006.01)
*B60B 9/26*   (2006.01)
(Continued)

(52) U.S. Cl.
CPC ............... *B60C 7/14* (2013.01); *B60B 5/02* (2013.01); *B60B 9/26* (2013.01); *B60B 19/10* (2013.01);
(Continued)

(58) Field of Classification Search
CPC .... B60B 9/02; B60B 9/04; B60B 9/10; B60B 9/26; B60C 7/10; B60C 7/14; B60C 2007/146
See application file for complete search history.

(56) References Cited

U.S. PATENT DOCUMENTS

2013/0167990 A1    7/2013  Bae
2014/0332127 A1*  11/2014  Iwamura ............. B60B 1/06
                                              152/17
(Continued)

FOREIGN PATENT DOCUMENTS

EP   2 610 073 A2   7/2013
JP   2-179503 A     7/1990
(Continued)

OTHER PUBLICATIONS

International Search Report dated Mar. 24, 2015 for PCT/JP2014/083428 filed on Dec. 17, 2014.
(Continued)

*Primary Examiner* — Jason R Bellinger
(74) *Attorney, Agent, or Firm* — Oblon, McClelland, Maier & Neustadt, L.L.P.

(57) ABSTRACT

The purpose of the present invention is to minimize decline in endurance, while improving vibration performance. The spokes of an airless tire are provided, as an integrated unit, with an outside annular portion joined to the inside peripheral surface of a tread ring, an inside annular portion joined to the outside peripheral surface of a hub, and a spoke plate portion of constant thickness providing linkage therebetween. The radial inner edge and the radial outer edge of the center plane of thickness of the spoke plate portion are respectively diagonal with respect to a tire axial-direction line. The intersection line at which the center plane of thickness intersects a plane that is at a right angle to the tire axial-direction line constitutes a straight line. The spoke
(Continued)

length, which is the length from the radial inner edge to the radial outer edge along the intersection line, is constant for any given location in the tire axial direction.

16 Claims, 10 Drawing Sheets

(51) Int. Cl.
*B60C 7/18* (2006.01)
*B60B 19/10* (2006.01)
*B60C 7/22* (2006.01)
*B60B 5/02* (2006.01)
*B60B 27/06* (2006.01)

(52) U.S. Cl.
CPC ............... *B60B 27/06* (2013.01); *B60C 7/18* (2013.01); *B60C 7/22* (2013.01); *B60B 2310/202* (2013.01); *B60B 2310/204* (2013.01); *B60B 2360/10* (2013.01); *B60B 2360/32* (2013.01); *B60B 2900/131* (2013.01); *B60B 2900/311* (2013.01); *B60B 2900/325* (2013.01)

(56) References Cited

U.S. PATENT DOCUMENTS

| | | | |
|---|---|---|---|
| 2016/0089935 A1* | 3/2016 | Iwamura | B60C 7/18 152/69 |
| 2016/0121656 A1* | 5/2016 | Sugiya | B60C 7/14 152/69 |
| 2016/0200144 A1* | 7/2016 | Iwamura | B60C 7/14 152/75 |
| 2017/0057288 A1* | 3/2017 | Sugiya | B60B 9/04 |
| 2017/0113484 A1* | 4/2017 | Iwamura | B60B 1/06 |
| 2017/0355227 A1* | 12/2017 | Sugiya | B60C 1/0008 |

FOREIGN PATENT DOCUMENTS

| | | |
|---|---|---|
| JP | 2008-132951 A | 6/2008 |
| JP | 2008-260514 A | 10/2008 |

OTHER PUBLICATIONS

Extended European Search Report dated Jul. 21, 2017 in Patent Application No. 14873785.1.

* cited by examiner

PRIOR ART

FIG.8(B)

PRIOR ART

FIG.9

PRIOR ART

FIG.10(A)

PRIOR ART

FIG.10(B)

PRIOR ART

AIRLESS TIRE

TECHNICAL FIELD

The present invention relates to an airless tire that suppresses reduction in durability while improving vibration performance.

BACKGROUND ART

There has been proposed an airless tire that is structured such that a cylindrical tread ring having a ground-contact surface and a hub to be fixed to an axle shaft are coupled by a plurality of radially arranged spoke plate members (for example, refer to Patent Document 1).

In the airless tire of this structure, conventionally, the spoke plate members are arranged along a tire axial direction. Accordingly, the ground-contact time of the spoke plate members becomes short, and a load on the axle shaft largely varies between when the spoke plate members are in contact with the ground and when the portions between the spoke plate members are in contact with the ground. This causes a problem of deteriorated vibration performance.

Figure 9:
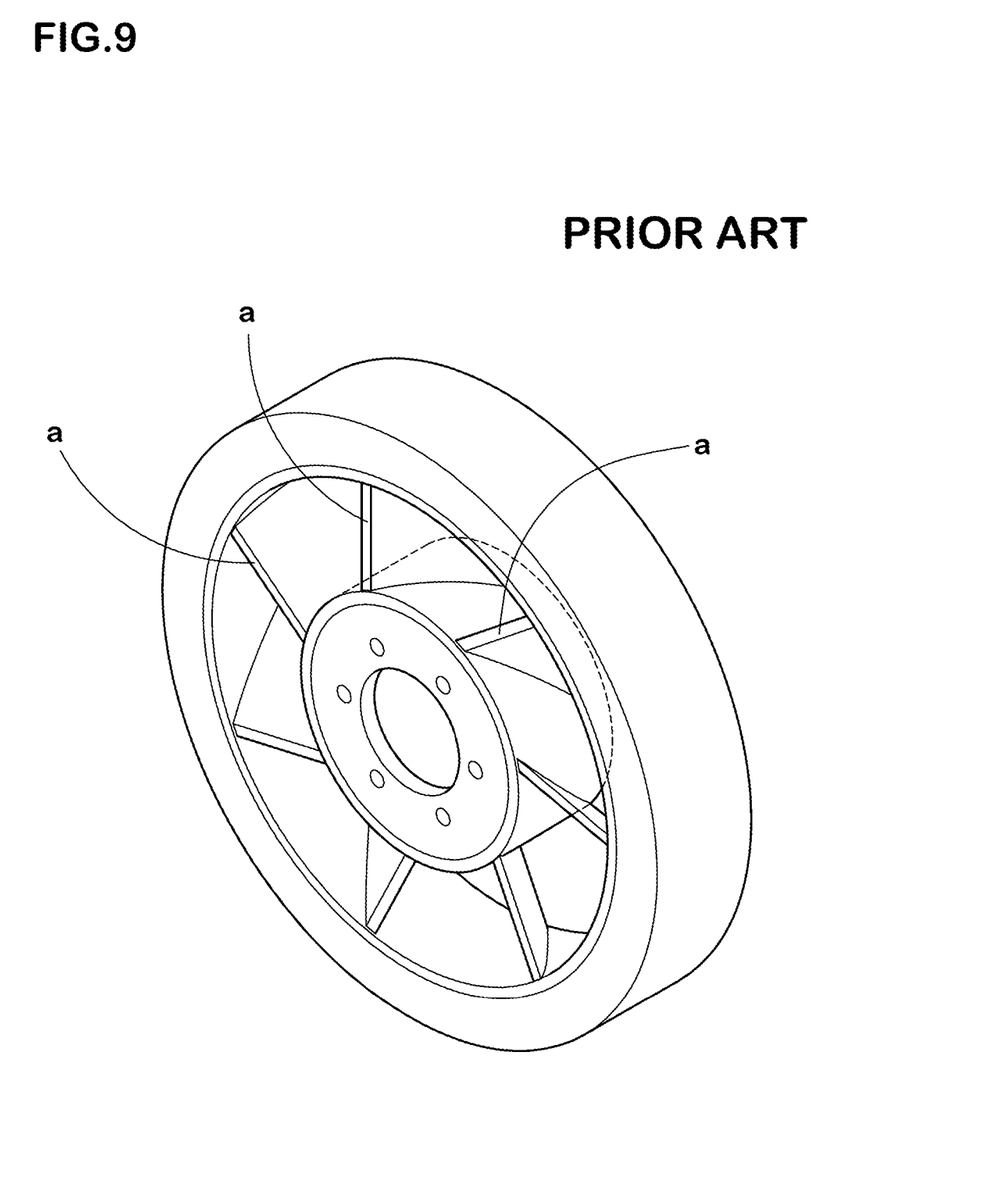
FIG. 9 is a perspective view of a reference airless tire improved in vibration performance that is different from the present invention.
Figure 10A:
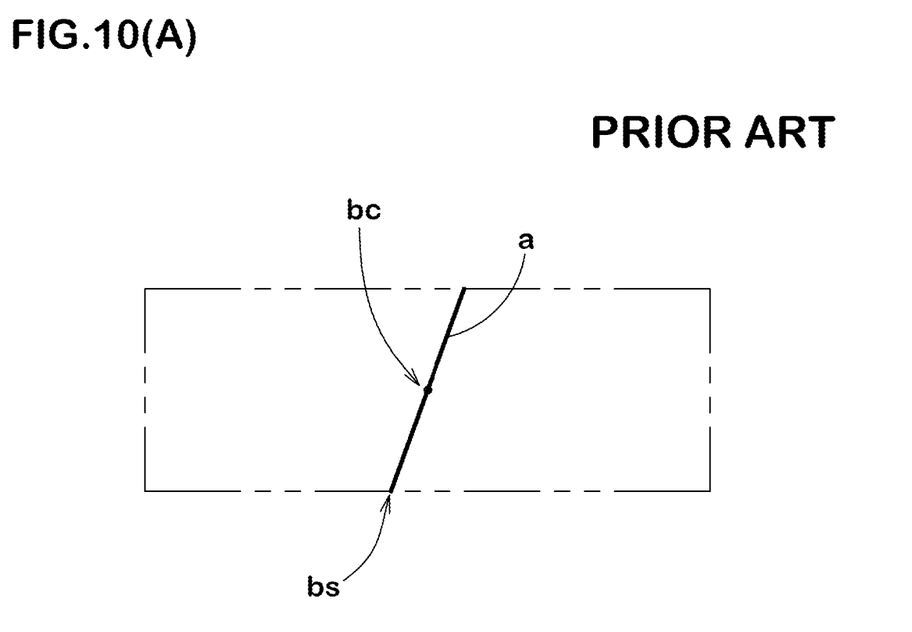
FIGS. 10A and 10B are plan view and side view illustrating the spoke length of the reference airless tire.
Figure 10B:
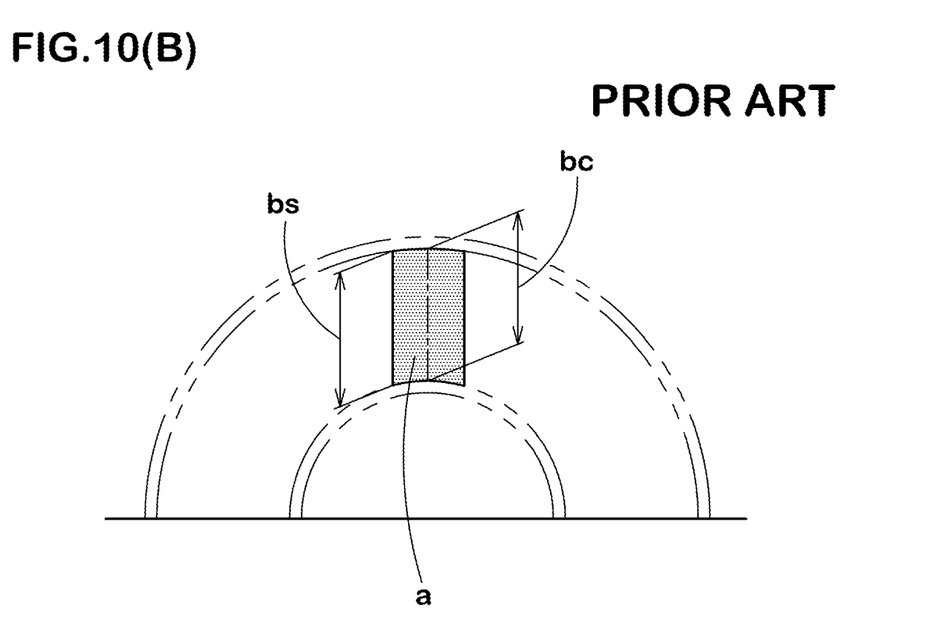

As illustrated in FIG. 9, the inventor of the present invention thus have proposed that spoke plate members (a) be inclined relative to the tire axial direction so that the ground-contact time of the spoke plate members (a) can be increased to improve vibration performance. Unfortunately, when the flat spoke plate members (a) are inclined relative to the tire axial direction, spoke length (bs) on the outer edge side in the tire axial direction becomes longer than spoke length (bc) on the central side in the tire axial direction as illustrated in FIGS. 10A and 10B as a plan view and a side view of the spoke plate member (a), respectively. That is, the spoke length does not become uniform at an arbitrary position in the tire axial direction. FIGS. 10A and 10B illustrate the spoke plate members (a) with a thickness of zero for the sake of convenience.

Accordingly, at the time of rolling, in one spoke plate member (a), a portion with a longer spoke length becomes more largely distorted than a portion with a shorter spoke length, and stress concentrates on the portion with a longer spoke length. This causes another problem that the portion with a longer spoke length breaks to decrease the lifetime of the tire.

CITATION LIST

Patent Literature

Patent Document 1: Japanese Unexamined Patent Application Publication No. 2008-260514

SUMMARY OF INVENTION

Technical Problem

An object of the present invention is to provide an airless tire that improves vibration performance and suppresses stress concentration to control reduction in durability.

Solution to Problem

The present invention provides an airless tire including a cylindrical tread ring having a ground-contact surface, a hub being arranged inside the tread ring in a radial direction and being to be fixed to an axle shaft, and a spoke formed of a casting of a polymer material and connecting the tread ring and the hub, wherein the spoke includes integrally an outer annular portion bonded to an inner peripheral surface of the tread ring, an inner annular portion bonded to an outer peripheral surface of the hub, and a spoke plate member with a uniform thickness connecting the outer annular portion and the inner annular portion, the spoke plate member includes a radial inner end edge where a thickness center plane crosses an outer peripheral surface of the inner annular portion and a radial outer end edge where the thickness center plane crosses an inner peripheral surface of the outer annular portion, the inner and outer end edges inclining relative to a tire axial-direction line, a cross line on which the thickness center plane crosses a plane at right angles to the tire axial-direction line is a straight line, and a spoke length L along the cross line measured from the radial inner end edge to the radial outer end edge at an arbitrary position in the tire axial direction is uniform.

Advantageous Effects of Invention

According to the present invention as described above, the spoke plate member have the radial inner end edge and the radial outer end edge of the thickness center plane inclined relative to the tire axial-direction line. Therefore, the ground-contact time of the spoke plate members increases and the load on the axle shaft becomes less varied between when the spoke plate members are in contact with the ground and when the portions between the spoke plate members are in contact with the ground. As a result, vibration performance can be improved.

In addition, the cross line on which the thickness center plane crosses the plane at right angles to the tire axial-direction line forms a straight line, and the spoke length L as length of the cross line is uniform at an arbitrary position in the tire axial direction. Accordingly, at the time of rolling, the amount of distortion of each spoke plate member becomes uniform at an arbitrary position in the tire axial direction to suppress the concentration of stress. As a result, it is possible to suppress damage of the spoke plate members and control reduction in durability of the tire resulting from the inclination of the spoke plate members.

DESCRIPTION OF EMBODIMENTS

Embodiment of the present invention will be described below in detail.

Figure 1:
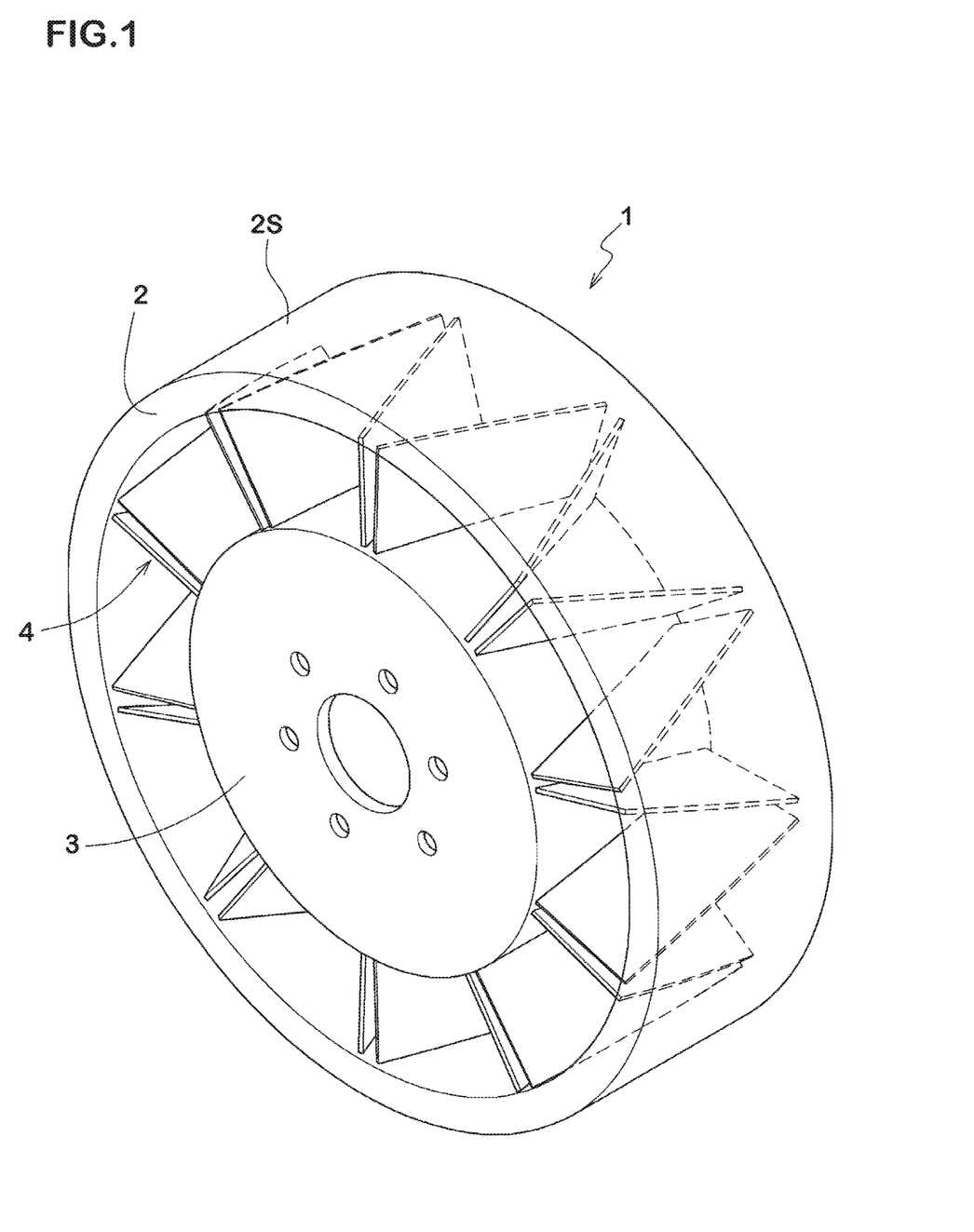
FIG. 1 is a perspective view of an example of an airless tire of the present invention.

As illustrated in FIG. 1, an airless tire 1 of the embodiment includes a circular cylindrical tread ring 2 having a ground-contact surface 2S, a hub 3 that is disposed radially inward of the tread ring 2 and that is to be fixed to an axle shaft J (illustrated in FIG. 2), and a spoke 4 that couples the tread ring 2 and the hub 3. In the embodiment, the airless tire 1 is configured as a tire for passenger cars.

Figure 2:
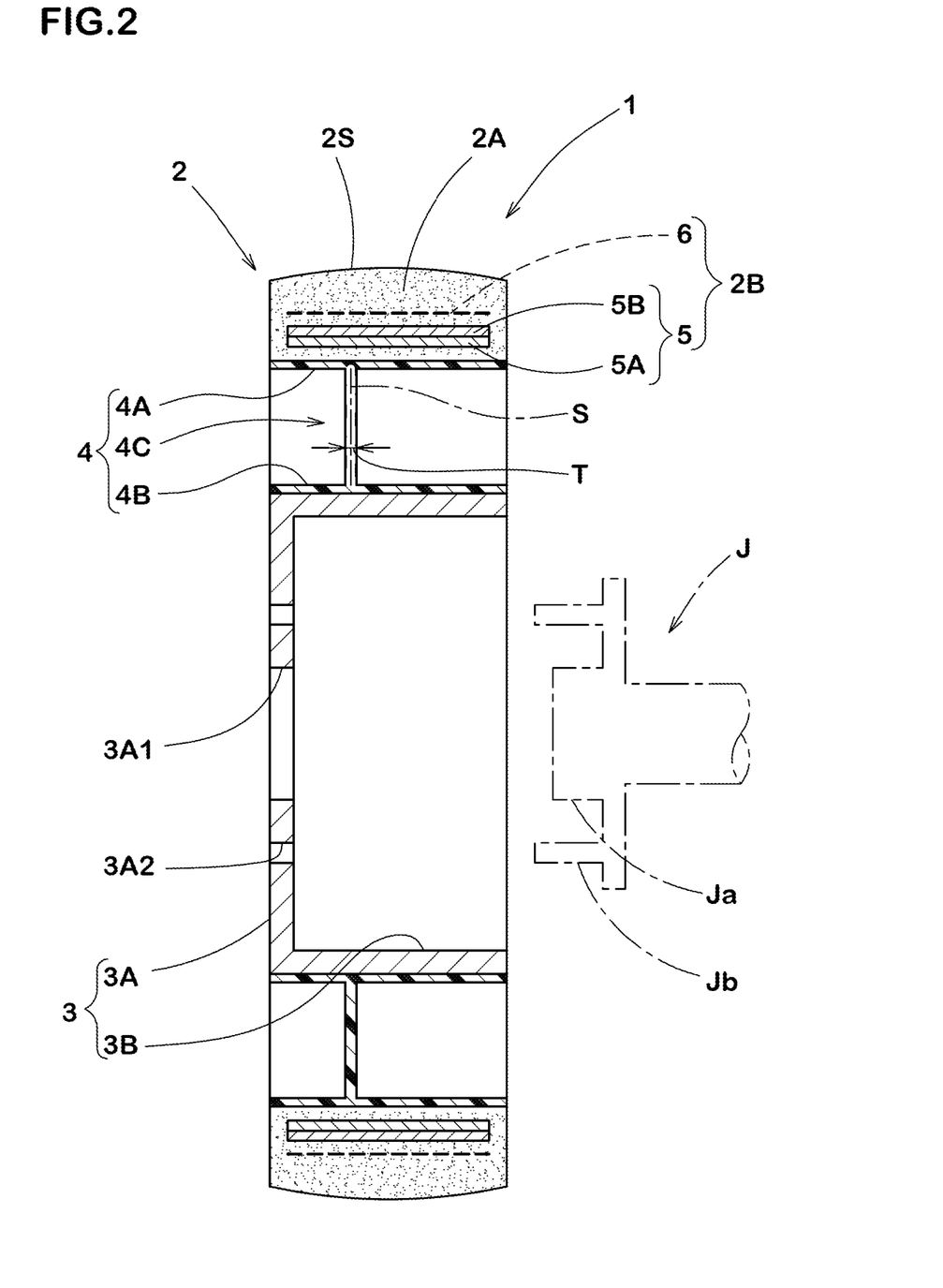
FIG. 2 is a cross-sectional view of FIG. 1 in an axial direction.

As illustrated in FIG. 2, the tread ring 2 is a portion equivalent to a tread portion in a pneumatic tire. The tread ring 2 includes a tread rubber portion 2A and a reinforcement cord layer 2B embedded in the tread rubber portion 2A.

As the tread rubber portion 2A, a rubber composition excellent in frictional force and friction-proof performance for ground contact is preferably employed. The tread ring 2 is provided with a tread groove (not illustrated) formed in various pattern shapes on the ground-contact surface 2S as outer peripheral surface to offer wet performance.

In this embodiment, the reinforcement cord layer 2B is formed of a belt layer 5 and a band layer 6 disposed on the belt layer 5 outside or inside in the radial direction. Alternatively, the reinforcement cord layer 2B may be formed of only the belt layer 5 or the band layer 6. The belt layer 5 is composed of at least one, in this example, two belt plies 5A and 5B of tire cords oriented at an angle of from 10 to 45 degrees with respect to the tire circumferential direction, for example. The tire cords cross each other between the plies to enhance the rigidity of the tread ring 2. The band layer 6 is composed of at least one, in this example, one band ply formed by winding a tire cord in a spiral manner in the tire circumferential direction.

The tire cords of the belt layer 5 and the tire cord of the band layer 6 can be appropriately steal cords or organic fiber cords, respectively. For organic fiber cords, high-modulus fiber is preferably used such as high-strength and high-elasticity aramid, polyethylene naphthalene (PEN), polyethylene terephthalate (PET).

The tread ring 2 is formed by vulcanizing and molding a raw tread ring in a vulcanization mold. The raw tread ring is formed by winding sequentially a sheet-like member for the belt layer 5, a sheet-like member for the band layer 6, and a sheet-like member for the tread rubber portion 2A on a circular cylindrical drum in the circumferential direction, for example.

The hub 3 is equivalent to a wheel, and includes a circular plate-like disc portion 3A to be fixed to the axle shaft J and a circular cylindrical spoke attachment portion 3B that is formed integrally with a radial outer end portion of the disc portion 3A. The disc portion 3A has a hub hole 3A1 in the center for insertion of a front end portion Ja of the axle shaft J. The disc portion 3A has around the hub hole 3A1 a plurality of bolt insertion holes 3A2 for tightening with nuts bolt portions Jb disposed on the axle shaft side. The hub 3 is preferably formed of a metallic material such as steel, aluminum alloy, or magnesium alloy, for example, similar to conventional wheels.

Figure 3:
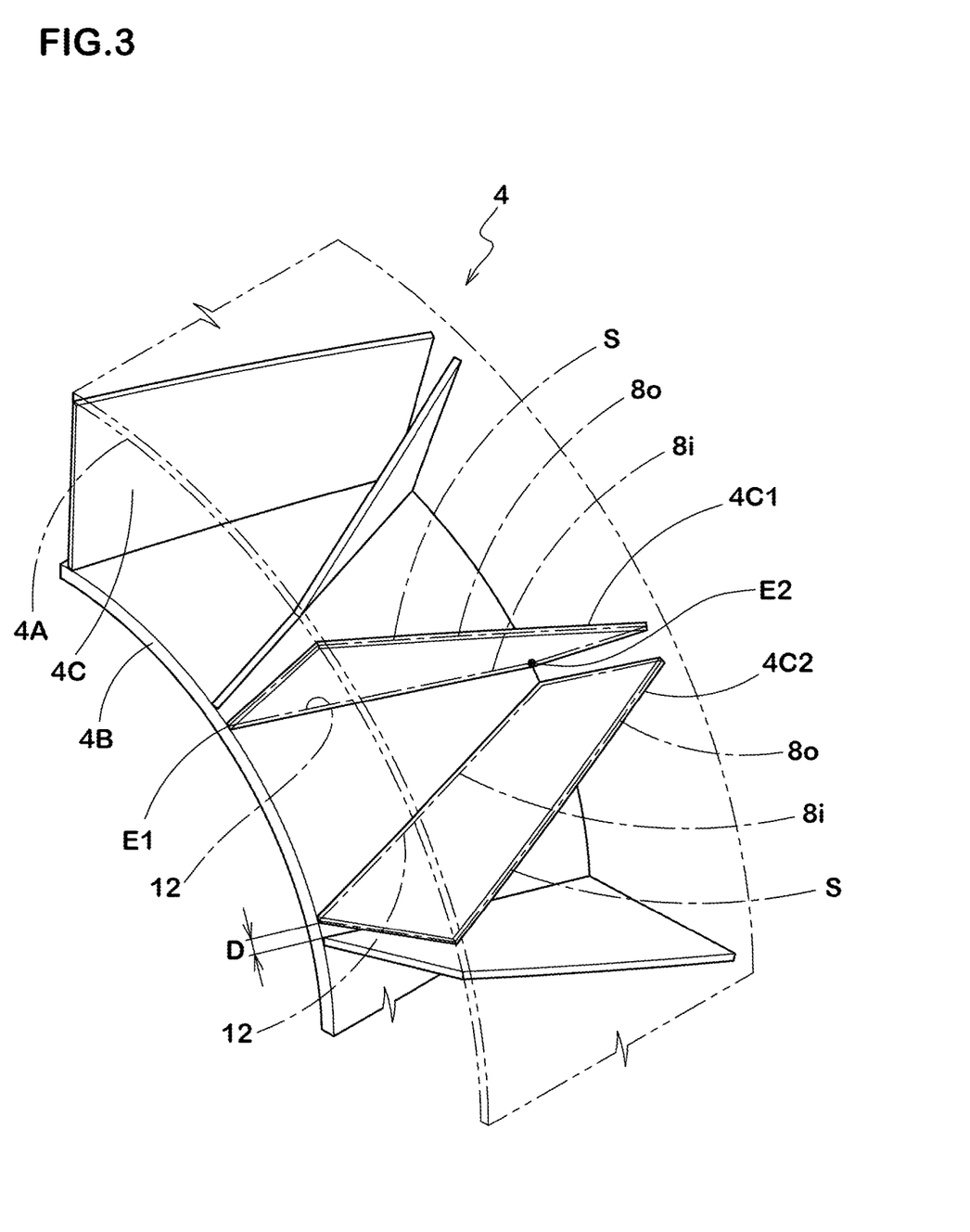
FIG. 3 is a partial perspective view of a spoke.

Next, the spoke 4 includes a casting of a polymer material. As illustrated in FIGS. 2 and 3, the spoke 4 includes integrally an outer annular portion 4A, an inner annular portion 4B, and a plurality of spoke plate members 4C with a uniform thickness.

The polymer material can be a thermoplastic resin or a thermoset resin. However, from the viewpoint of safety, the polymer material is preferably a thermoset resin such as an epoxy resin, a phenol resin, a urethane resin, a silicon resin, a polyimide resin, or a melamine resin, for example. In particular, the urethane resin is more preferred for its elastic characteristics.

The outer annular portion 4A is a circular cylindrical body that is concentric to the axle shaft J. The outer peripheral surface of the outer annular portion 4A is bonded to the inner peripheral surface of the tread ring 2 via an adhesive, for example. The inner annular portion 4B is a circular cylindrical body that is concentric to and disposed inside the outer annular portion 4A in the radial direction. The inner peripheral surface of the inner annular portion 4B is bonded to the outer peripheral surface of the hub 3 via an adhesive, for example.

The spoke plate members 4C couple the outer annular portion 4A and the inner annular portion 4B. Each of the spoke plate members 4C includes a thickness center plane S that includes a radial inner end edge $8i$ crossing the outer peripheral surface of the inner annular portion 4B and a radial outer end edge $8o$ crossing the inner peripheral surface of the outer annular portion 4A. Each of the radial inner end edge $8i$ and the radial outer end edge $8o$ inclines relative to the tire axial-direction line.

Since the radial inner end edges $8i$ and the radial outer end edges $8o$ of the thickness center planes S incline as described above, the ground-contact time of the spoke plate members 4C increases. In addition, the load on the axle shaft becomes less varied between when the spoke plate members 4C are in contact with the ground and when the portions between the spoke plate members 4C and 4C are in contact with the ground. This improves vibration performance. In particular, the spoke plate members 4C are composed of first spoke plate members 4C1 in which the radial inner end edges $8i$ and outer end edges $8o$ incline to one side relative to the tire axial-direction line and second spoke plate members 4C2 in which the radial inner end edges $8i$ and outer end edges $8o$ incline to the other side relative to the tire axial direction. Further, the first spoke plate members 4C1 and the second spoke plate members 4C2 are alternately arranged in a zigzag manner in the circumferential direction. Accordingly, the spoke 4 becomes enhanced in bilateral symmetric property and is expected to improve uniformity and suppress vehicle flow. A space D between closest ends of adjacent first and second spoke plate members 4C1 and 4C2 at one side is preferably set to be smaller than a ground-contact length (not illustrated), more preferably 15 mm or less, from the viewpoint of vibration performance.

Figure 4A:
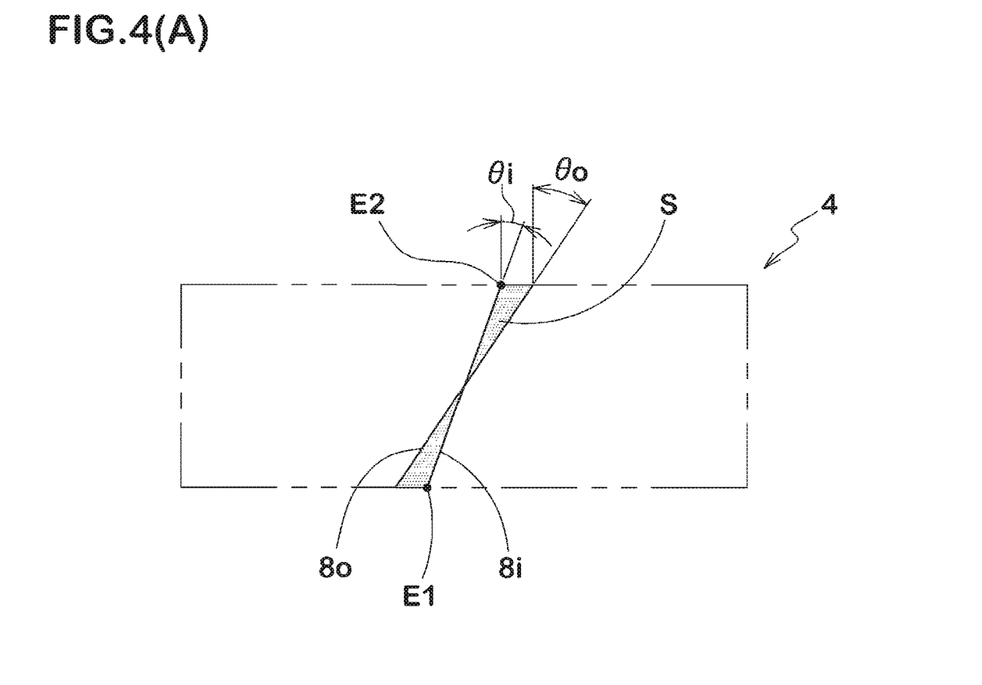
FIGS. 4A and 4B are conceptual plan view and side view of a thickness center plane, respectively.
Figure 4B:
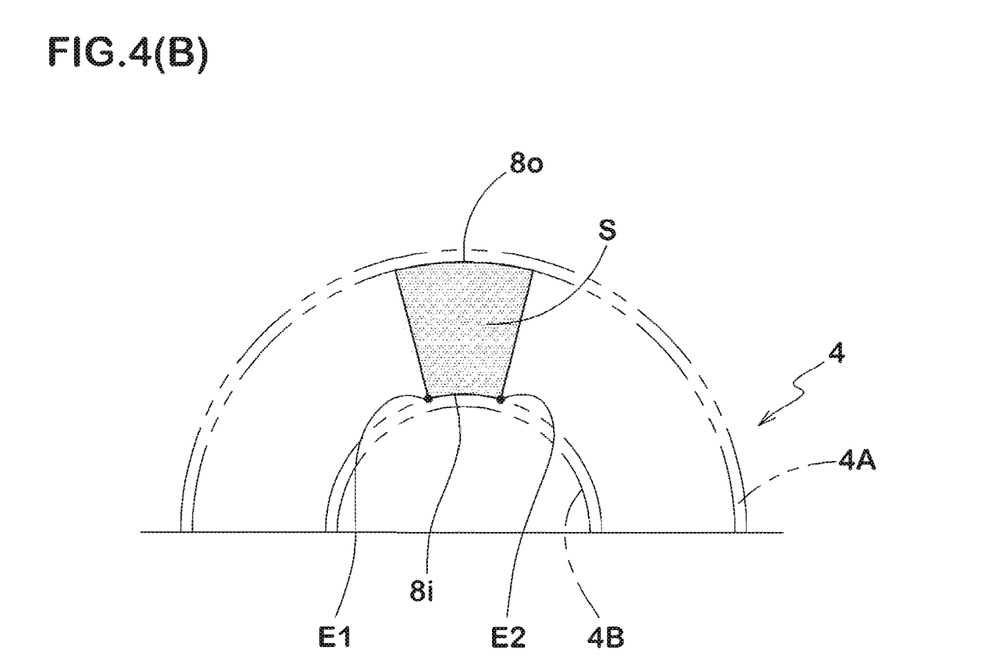

FIGS. 4A and 4B are conceptual plan view and side view of the thickness center plane S, respectively. As illustrated in FIGS. 4A and 4B, the radial inner end edge $8i$ and outer end edge $8o$ of the thickness center plane S incline at respective angles $\theta i$ and $\theta o$ relative to the tire axial-direction line, and the angles $\theta i$ and $\theta o$ are in the relationship $\theta i < \theta o$. Therefore, the spoke plate members 4C are formed in a twisted plate shape.

Figure 5A:
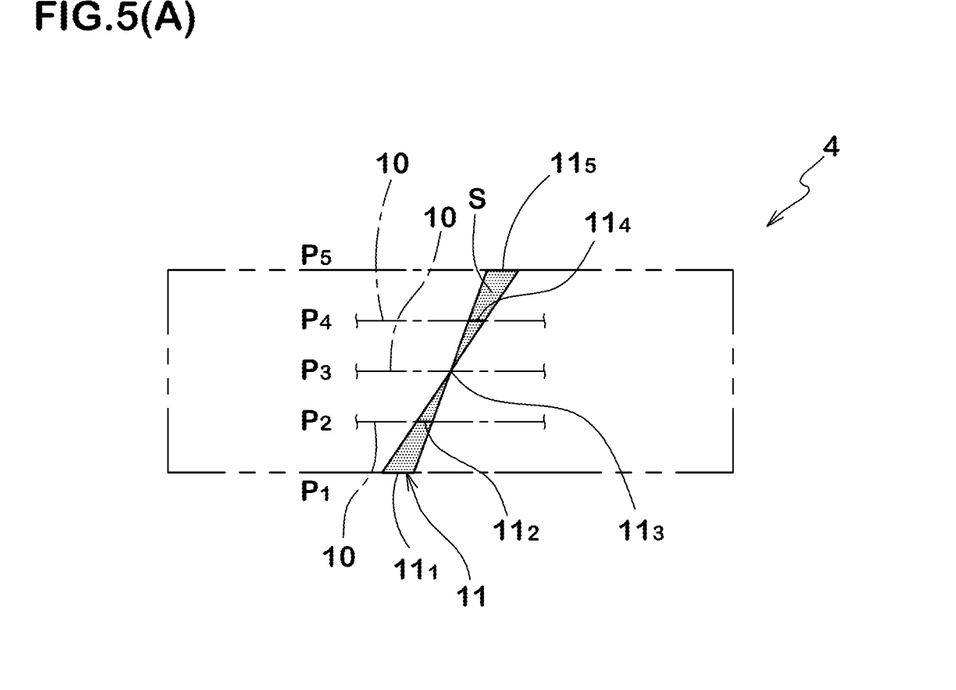
FIGS. 5A and 5B are plan view and side view of the thickness center plane, showing a cross line on which the thickness center plane crosses a plane at right angles to a tire axial-direction line, respectively.
Figure 5B:
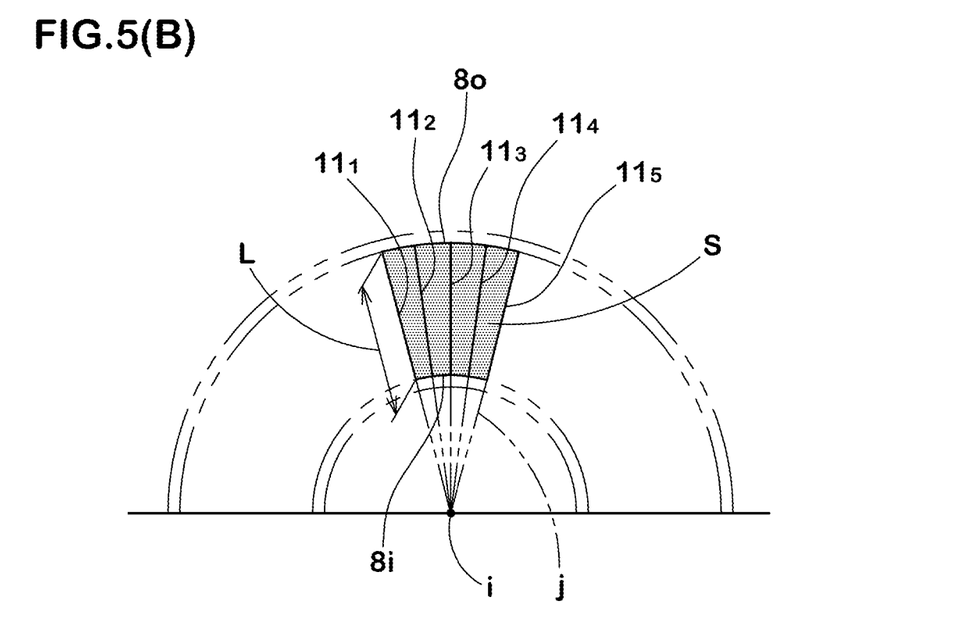

FIGS. 5A and 5B are conceptual plan view and side view of the thickness center plane S. As illustrated in FIGS. 5A and 5B, a cross line 11 on which the thickness center plane S crosses a plane 10 at right angles to the tire axial-direction line forms a straight line. In addition, a spoke length L from the radial inner end edge $8i$ to the radial outer end edge $8o$ along the cross line 11 is uniform at an arbitrary position in the tire axial direction. FIGS. 5A and 5B illustrate cross lines $11_1$ to $11_5$ disposed at five arbitrary positions P1 to P5 in the tire axial direction. The spoke lengths of the cross lines $11_1$ to $11_5$ are equal to one another.

As described above, the length (spoke length L) of the cross line 11 at an arbitrary position in the tire axial direction is uniform. Accordingly, at the time of rolling, the amount of distortion of each spoke plate member 4C becomes uniform at an arbitrary position in the tire axial direction. As a result, it is possible to suppress stress concentration and reduce damage of the spoke plate members 4C.

In particular, in this embodiment, the cross line 11 forms a part of a radial line (j) extending from a tire axis (i) at an arbitrary position in the tire axial direction. Accordingly, it is possible to transfer the load on the tire to the axle shaft in the most effective manner to contribute to improvement of durability.

Figure 6:
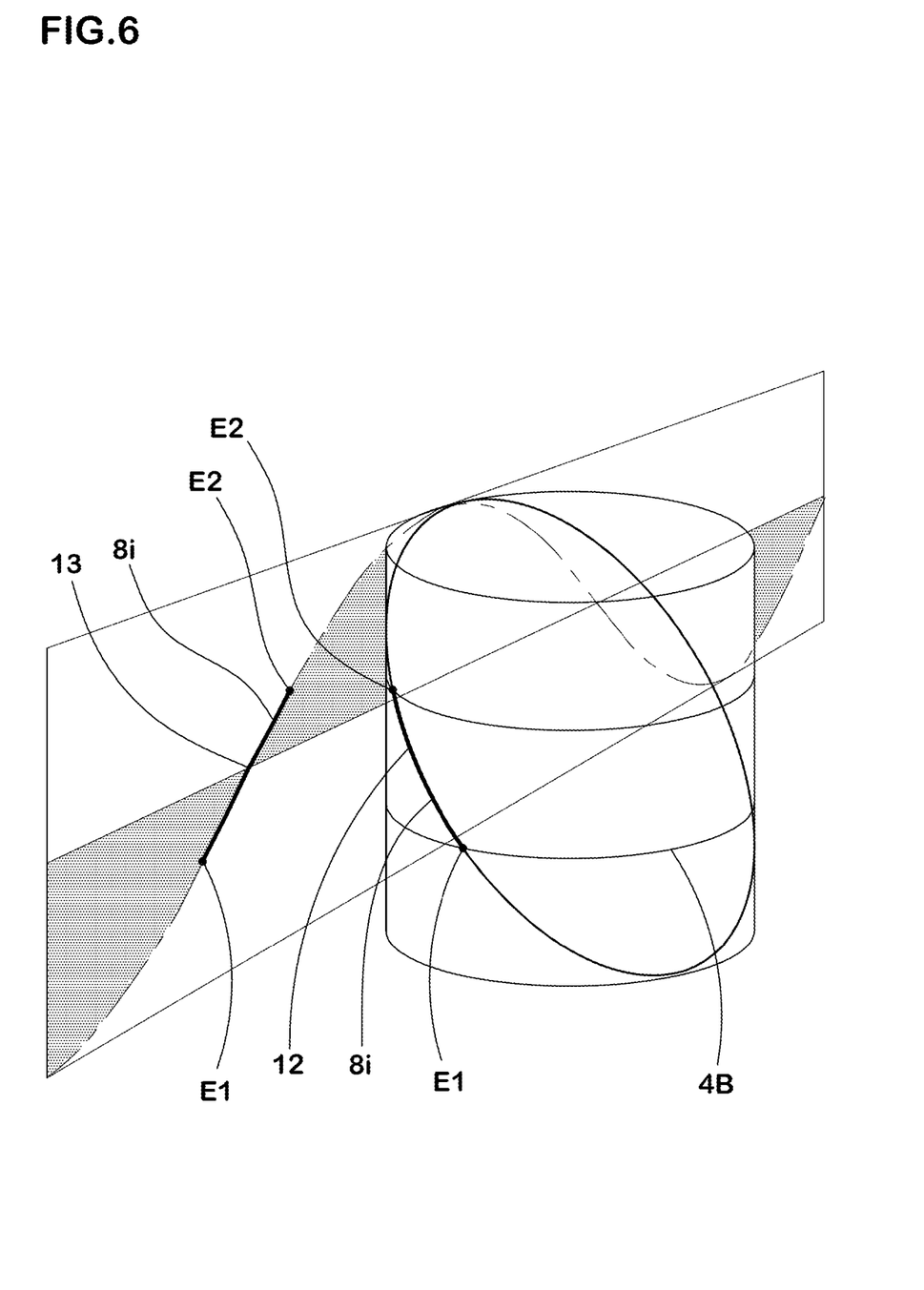
FIG. 6 is a perspective view for describing a radial inner end edge of the thickness center plane.

In this embodiment, the radial inner end edge 8i forms a shortest distance line 12 that connects an axially first end point E1 on one side of the radial inner end edge 8i and an axially second end point E2 on the other side of the radial inner end edge 8i at the shortest distance along the outer peripheral surface of the inner annular portion 4B as illustrated in FIG. 3. When the outer peripheral surface of the inner annular portion 4B is opened in a plane, the shortest distance line 12 appears as a part of a sine curve 13 as illustrated in FIG. 6. By forming the radial inner end edge 8i as the shortest distance line 12 as described above, it is possible to enhance the rigidity of the spoke plate members 4C in the width direction to contribute to improvement of durability.

The polymer material for the spoke 4 has preferably a 100% tensile stress $M_{100}$ of 2 MPa or more, more preferably 4 MPa or more. In addition, a thickness T of the spoke plate members 4C is preferably of from 1 to 5 mm, and a ratio L/T of the spoke length L to the thickness T is preferably from 5 to 400.

When the 100% tensile stress $M_{100}$ of the polymer material is less than 2 MPa, the spoke plate members 4C become lack of strength to make it difficult to ensure sufficient durability. When the thickness T of the spoke plate members 4C is less than 1 mm, the spoke plate members 4C become too thin. As a result, injection molding of the spoke plate members 4C becomes difficult because the polymer material may flow defectively in the mold during injection molding. When the thickness T exceeds 5 mm, there is no problem in use but the tire increases weight to bring disadvantages to fuel economy performance. When the ratio L/T is less than 5, there is no problem in use but the spoke plate members 4C occupy most of the space between the tread ring 2 and the hub 3, and the tire increases weight to bring disadvantages to fuel economy performance. In contrast, when the ratio L/T exceeds 400, the spoke plate members 4C become too thin and too long. Therefore, the spoke plate members 4C become lack of strength to make it difficult to ensure sufficient durability.

Figure 7:
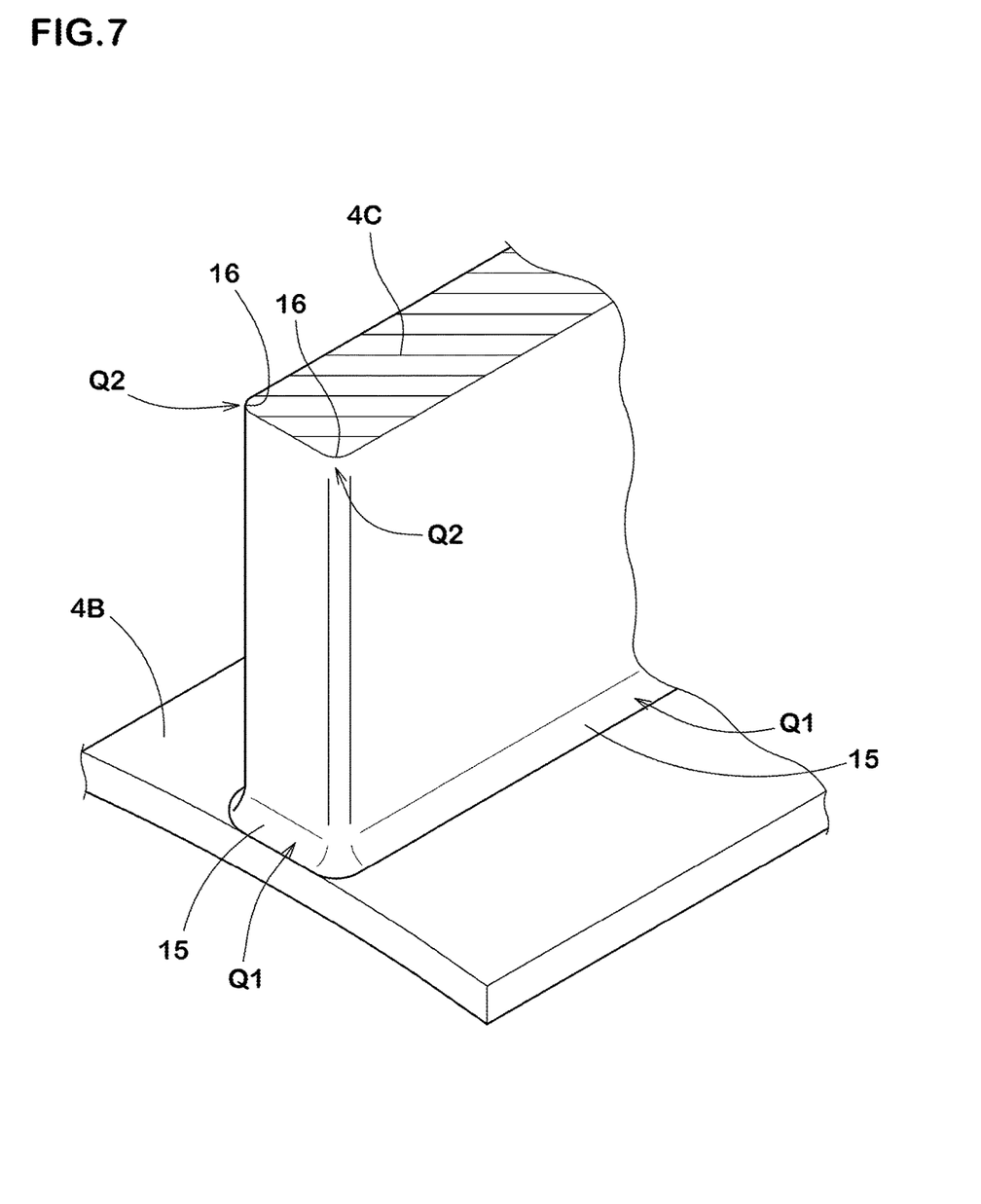
FIG. 7 is a conceptual perspective view of a corner portion among the spoke plate member, an inner annular portion, and outer annular portion.

As conceptually illustrated in FIG. 7, it is preferred to form an arc surface 15 with a radius of 0.5 mm or more at a recessed corner portion Q1 of an intersection between the outer surface of the spoke plate member 4C and the outer peripheral surface of the inner annular portion 4B and the inner peripheral surface of the outer annular portion 4A, thereby to connect the surface in a smooth way. It is also preferred to form a chamfer composed of an arc surface 16 with a radius of 0.5 mm or more at an edge portion Q2 of the spoke plate member 4C. Accordingly, it is possible to suppress concentration of distortion in the corner portion Q1 and the edge portion Q2 to contribute to improvement of durability of the spoke 4.

The particularly preferred embodiment of the present invention has been described in detail so far. However, the present invention is not limited to the illustrated embodiment but can be modified in various manners.

Examples

In order to confirm effect of the present invention, airless tires for passenger cars (with a size 145/70R12) having the structure illustrated in FIG. 1 were prototyped in accordance with the specifications shown in Table 1. The sample tires were tested for durability and vibration performance. In addition, the spokes of the sample tires were weighed.

The tires were based substantially on the same specifications except for those described in Table 1, and their spokes were formed integrally with tread rings and hubs by a casting of a urethane resin (thermoset resin).

Figure 8A:
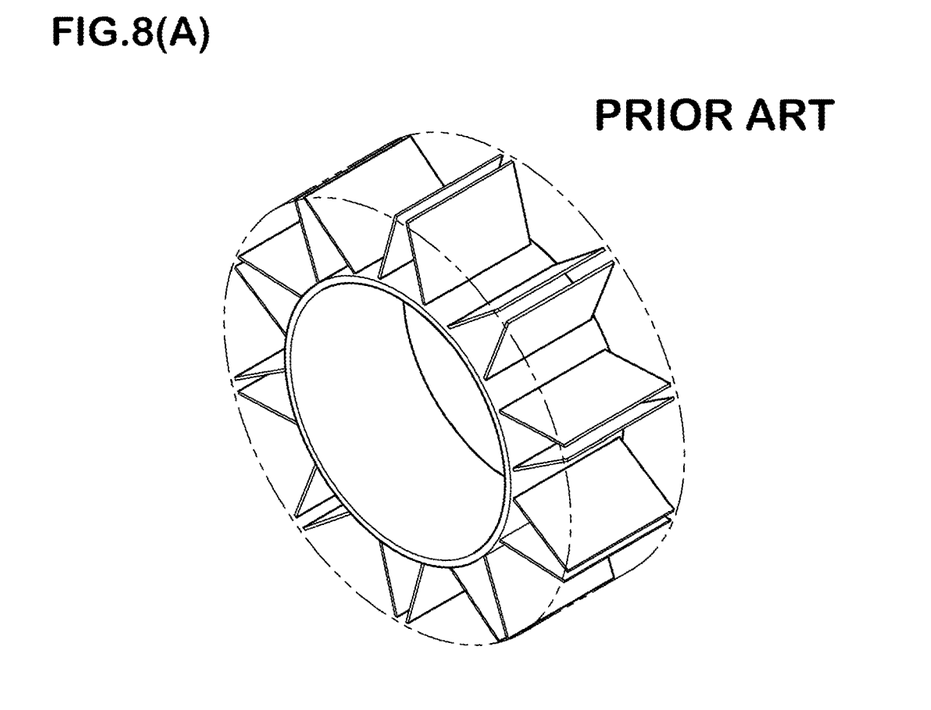
FIGS. 8A and 8B are perspective views illustrating the states of arrangement of spoke plate members of airless tires of comparative examples 1 and 2 shown in table 1.

(a) FIG. 8A illustrates the state of arrangement of spoke plate members of Comparative example 1. In Comparative example 1, the radial inner end edges and outer end edges of the spoke plate members are disposed along the tire axial direction.

Figure 8B:
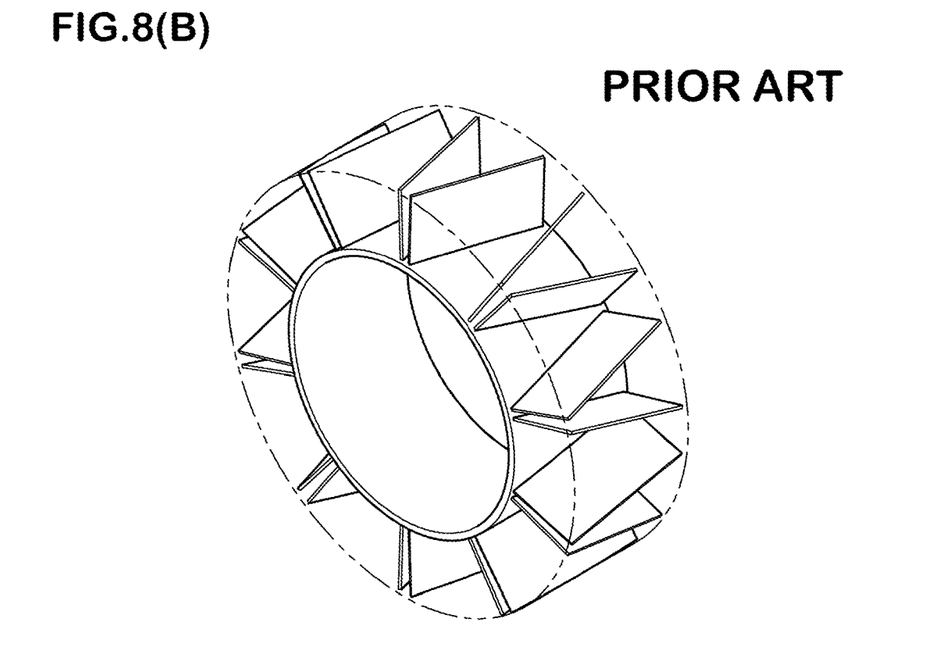

(b) FIG. 8B illustrates the state of arrangement of spoke plate members of Comparative example 2. In Comparative example 2, the radial inner end edges and outer end edges of thickness center planes of the spoke plate members incline relative to the tire axial direction as in Examples 1 to 10. The angle θ1 of the radial inner end edges relative to the tire axial-direction line is the same as the angle θ1 of Example 1 to 10. In both of Comparative examples 1 and 2, the spoke plate members are formed in a flat plate shape.

(c) The state of arrangement of the spoke plate members in Comparative example 3 is the same as the state of arrangement of the spoke plate members in Example 1 to 10. However, the thickness T of the spoke plate members is not uniform but increases gradually from the radial inner end edge side to outer end edge side in proportion to the distance from the tire axis.

(d) In Example 3, the cross line inclines relative to the radial line. Accordingly, the spoke length L is 72 mm that is slightly longer than those of Examples 1 and 2, and others.

In the examples and the comparative examples, the radial inner end edges of the thickness center planes are formed by the shortest distance lines.

(1) Durability Performance:

The sample tires were run on a drum tester under a load of 3 kN and at a speed of 100 km/h, and the running distances until the tires became broken were measured and indexed with reference to an index of 500 representing the values of Example 1. The larger indexes indicate more excellent durability performance.

(2) Vibration Performance:

The sample tires were mounted on the four wheels of a vehicle (ultra-small EV: product name COMS), and the vehicle was run on a tire test road with a dry asphalt surface. The sample tires were tested for vibration performance by the driver's sensory evaluation and were indexed with reference to an index of 500 representing the values of Example 1. The larger indexes indicate more excellent vibration performance.

(3) The Weights of the Spokes:

The weights of the spokes were calculated from the difference in weight between before and after the molding.

TABLE 1

| | Com. ex. 1 | Com. ex. 2 | Com. ex. 3 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| <Spoke plate members> | Flat-plate form | Flat-plate form | Flat-plate form | Twisted plate form | Twisted plate form | Twisted plate form | Twisted plate form | Twisted plate form | Twisted plate form | Twisted plate form | Twisted plate form |
| Arrangement state | FIG. 8A | FIG. 8B | FIG. 3 | FIG. 3 | FIG. 3 | FIG. 3 | FIG. 3 | FIG. 3 | FIG. 3 | FIG. 3 | FIG. 3 |
| Orientation of inner and outer end edges | Along axis | Along axis | Inclined | Inclined | Inclined | Inclined | Inclined | Inclined | Inclined | Inclined | Inclined |
| Cross line | Straight (*1) | Straight (*1) | Straight (Radial direction) | Straight (Radial direction) | Straight (Radial direction) | Straight (Radial direction) | Straight (*1) | Straight (*1) | Straight (Radial direction) | Straight (Radial direction) | Straight (Radial direction) |
| Uniformity of spoke length | Uniform | Non-uniform (*2) | Uniform | Uniform | Uniform | Uniform | Uniform | Uniform | Uniform | Uniform | Uniform |
| •Spoke length L (mm) | 67.3 | 67.3 to 68.0 | 67.3 | 67.3 | 67.3 | 67.3 | 72 | 67.3 | 67.3 | 67.3 | 67.3 |
| Uniformity of spoke thickness | Uniform | Non-uniform (*3) | Uniform | Uniform | Uniform | Uniform | Uniform | Uniform | Uniform | Uniform | Uniform |
| •Spoke thickness T (mm) | 3 | 3 to 4 | 3 | 3 | 3 | 3 | 3 | 0.8 | 7 | 5 | 1 |
| Ratio L/T | 22.4 | 19.2 (*4) | 22.4 | 22.4 | 22.4 | 22.4 | 22.4 | 84.1 | 9.6 | 13.5 | 67.3 |
| $M_{100}$ (MPa) | 8 | 8 | 8 | 8 | 8 | 8 | 8 | 1.5 | 8 | 8 | 8 |
| Arc surfaces of edges and corners | Absent | Absent | Present | Present | Present | Present | Present | Absent | Absent | Absent | Absent |
| Durability performance | 300 | 50 | 150 | 500 | 300 | 300 | 150 | 200 | 300 | 300 | 250 |
| Vibration performance | 100 | 500 | 500 | 500 | 500 | 500 | 500 | 500 | 500 | 500 | 500 |
| Weight of spoke (kg) | 3.0 | 3.1 | 3.2 | 3.0 | 3.0 | 3.1 | 3.0 | 0.8 | 7.0 | 5.0 | 1.0 |

| | Ex. 9 | Ex. 10 | Ex. 11 | Ex. 12 | Ex. 13 |
|---|---|---|---|---|---|
| <Spoke plate parts> | Twisted plate form | Twisted plate form | Twisted plate form | Twisted plate form | Twisted plate form |
| Arrangement state | FIG. 3 | FIG. 3 | FIG. 3 | FIG. 3 | FIG. 3 |
| Orientation of inner and outer end edges | Inclined | Inclined | Inclined | Inclined | Inclined |
| Cross line | Straight (Radial direction) | Straight (Radial direction) | Straight (Radial direction) | Straight (Radial direction) | Straight (Radial direction) |
| Uniformity of spoke length | Uniform | Uniform | Uniform | Uniform | Uniform |
| Spoke length L (mm) | 67.3 | 67.3 | 67.3 | 67.3 | 67.3 |
| Uniformity of spoke thickness | Uniform | Uniform | Uniform | Uniform | Uniform |
| Spoke thickness T (mm) | 3 | 7 | 3 | 0.2 | 14 |
| Ratio L/T | 22.4 | 9.6 | 22.4 | 400 | 5 |
| $M_{100}$ (MPa) | 3 | 1.5 | 2 | 8 | 8 |
| Arc surfaces of edges and corners | Absent | Absent | Absent | Absent | Absent |
| Durability performance | 200 | 200 | 200 | 200 | 100 |
| Vibration performance | 500 | 500 | 500 | 500 | 500 |
| Weight of spoke (kg) | 3.0 | 7.0 | 2.0 | 0.2 | 14.0 |

(*1) The cross line inclines relative to the radial direction.
(*2) The spoke length on the outer end edge side in the tire axial direction is larger than the spoke length on the central side in the tire axial direction.
(*3) The thickness T of the spoke plate members increases gradually from the radial inner end edge side to outer end edge side in proportion to the distance from the tire axis.
(*4) The ratio L/T is calculated from the average value of the spoke thickness.

The invention claimed is:

1. An airless tire, comprising:
a tread ring having a cylindrical form and having a ground-contact surface;
a hub positioned inside the tread ring in a radial direction and configured to be fixed to an axle shaft; and
a spoke comprising a polymer material and connecting the tread ring and the hub,
wherein the spoke comprises integrally an outer annular portion bonded to an inner peripheral surface of the tread ring, an inner annular portion bonded to an outer peripheral surface of the hub, and a plurality of spoke plate members with a uniform thickness connecting the outer annular portion and the inner annular portion, each of the spoke plate members comprises a radial inner end edge where a thickness center plane of each spoke plate member crosses an outer peripheral surface of the inner annular portion and a radial outer end edge where the thickness center plane crosses an inner peripheral surface of the outer annular portion, the inner and outer end edges inclining relative to a tire axial-direction line, a cross line on which the thickness center plane crosses a plane at right angles to the tire axial-direction line is a straight line, and a spoke length (L) along the cross line measured from the radial inner end edge to the radial outer end edge at an arbitrary position in a tire axial direction is uniform.

2. The airless tire according to claim 1, wherein the radial inner end edge forms a shortest distance line that connects an axially first end point and an axially second end point of the radial inner end edge at the shortest distance along the outer peripheral surface of the inner annular portion.

3. The airless tire according to claim 1, wherein the cross line forms a part of a radial line extending from a tire axis at an arbitrary position in the tire axial direction.

4. The airless tire according to claim 1, wherein the plurality of spoke plate members comprises a plurality of first spoke plate members in which the radial inner end edge and outer end edge incline to one side relative to the tire axial-direction line and a plurality of second spoke plate members in which the radial inner end edge and outer end edge incline to the other side relative to the tire axial-direction line, and the first spoke plate members and the second spoke plate members are alternately positioned in the circumferential direction.

5. The airless tire according to claim 1, wherein the polymer material has a 100% tensile stress ($M_{100}$) of 2 MPa or more, a thickness (T) of the spoke plate member is from 1 to 5 mm, and a ratio (L/T) of the spoke length (L) to the thickness (T) is from 5 to 400.

6. The airless tire according to claim 2, wherein the cross line forms a part of a radial line extending from a tire axis at an arbitrary position in the tire axial direction.

7. The airless tire according to claim 2, wherein the plurality of spoke plate members comprises a plurality of first spoke plate members in which the radial inner end edge and outer end edge incline to one side relative to the tire axial-direction line and a plurality of second spoke plate members in which the radial inner end edge and outer end edge incline to the other side relative to the tire axial-direction line, and the first spoke plate members and the second spoke plate members are alternately positioned in the circumferential direction.

8. The airless tire according to claim 2, wherein the polymer material has a 100% tensile stress ($M_{100}$) of 2 MPa or more, a thickness (T) of the spoke plate member is from 1 to 5 mm, and a ratio (L/T) of the spoke length (L) to the thickness (T) is from 5 to 400.

9. The airless tire according to claim 3, wherein the plurality of spoke plate members comprises a plurality of first spoke plate members in which the radial inner end edge and outer end edge incline to one side relative to the tire axial-direction line and a plurality of second spoke plate members in which the radial inner end edge and outer end edge incline to the other side relative to the tire axial-direction line, and the first spoke plate members and the second spoke plate members are alternately positioned in the circumferential direction.

10. The airless tire according to claim 3, wherein the polymer material has a 100% tensile stress ($M_{100}$) of 2 MPa or more, a thickness (T) of the spoke plate member is from 1 to 5 mm, and a ratio (L/T) of the spoke length (L) to the thickness (T) is from 5 to 400.

11. The airless tire according to claim 4, wherein the polymer material has a 100% tensile stress ($M_{100}$) of 2 MPa or more, a thickness (T) of the spoke plate member is from 1 to 5 mm, and a ratio (L/T) of the spoke length (L) to the thickness (T) is from 5 to 400.

12. The airless tire according to claim 6, wherein the plurality of spoke plate members comprises a plurality of first spoke plate members in which the radial inner end edge and outer end edge incline to one side relative to the tire axial-direction line and a plurality of second spoke plate members in which the radial inner end edge and outer end edge incline to the other side relative to the tire axial-direction line, and the first spoke plate members and the second spoke plate members are alternately positioned in the circumferential direction.

13. The airless tire according to claim 6, wherein the polymer material has a 100% tensile stress ($M_{100}$) of 2 MPa or more, a thickness (T) of the spoke plate member is from 1 to 5 mm, and a ratio (L/T) of the spoke length (L) to the thickness (T) is from 5 to 400.

14. The airless tire according to claim 7, wherein the polymer material has a 100% tensile stress ($M_{100}$) of 2 MPa or more, a thickness (T) of the spoke plate member is from 1 to 5 mm, and a ratio (L/T) of the spoke length (L) to the thickness (T) is from 5 to 400.

15. The airless tire according to claim 12, wherein the polymer material has a 100% tensile stress ($M_{100}$) of 2 MPa or more, a thickness (T) of the spoke plate member is from 1 to 5 mm, and a ratio (L/T) of the spoke length (L) to the thickness (T) is from 5 to 400.

16. The airless tire according to claim 9, wherein the polymer material has a 100% tensile stress ($M_{100}$) of 2 MPa or more, a thickness (T) of the spoke plate member is from 1 to 5 mm, and a ratio (L/T) of the spoke length (L) to the thickness (T) is from 5 to 400.

\* \* \* \* \*